United States Patent [19]

Hawley

[11] 4,311,405
[45] Jan. 19, 1982

[54] SWIVEL CONNECTOR

[75] Inventor: Harry R. Hawley, Lombard, Ill.

[73] Assignee: Illinois Tool Works Inc., Chicago, Ill.

[21] Appl. No.: 87,125

[22] Filed: Oct. 22, 1979

[51] Int. Cl.³ .................... F16C 11/00; F16D 1/12
[52] U.S. Cl. .................................. 403/142; 403/164
[58] Field of Search ............... 403/164, 165, 141, 313

[56] References Cited

U.S. PATENT DOCUMENTS

| | | | |
|---|---|---|---|
| 1,732,888 | 10/1929 | Harris et al. | 403/141 |
| 3,112,910 | 12/1963 | Bal | 403/141 X |
| 3,552,775 | 3/1968 | Warner | 403/164 X |
| 4,037,978 | 7/1977 | Connelly | 403/164 |

FOREIGN PATENT DOCUMENTS

| | | | |
|---|---|---|---|
| 657849 | 3/1938 | Fed. Rep. of Germany | 403/141 |
| 660303 | 4/1938 | Fed. Rep. of Germany | 403/141 |

Primary Examiner—Wayne L. Shedd
Attorney, Agent, or Firm—Jerold M. Forsberg; T. W. Buckman; J. R. Halvorsen

[57] ABSTRACT

There is disclosed a new and improved swivel connector assembly of the type which pivotally connects a ball-like member to a rod-like member. The connector includes a coupler having a pair of sockets. One of the sockets having a bearing seat adapted for receiving and confining a pivot-like ball therein and the other socket adapted for receiving and capturing an end of the rod-like member. The coupler is slotted for permitting enlargement of the sockets to enable insertion of the end of the rod-like member into one of the sockets and insertion of the ball-like member into the bearing seat of the other socket. The connector further includes a sleeve adapted to be received over one end of the coupler in an initial position and rotatable relative thereto to a final position. The outer dimension of the coupler and inner dimension of the sleeve are arranged for allowing the enlargement of the bearing seat for receiving the ball-like member and for clampingly securing the coupler as the sleeve is rotated to the final position to establish a reliable pivot connection between the ball-like member and the socket with the bearing seat and to cause the other socket to securely capture the end of the rod-like member.

11 Claims, 10 Drawing Figures

SWIVEL CONNECTOR

BACKGROUND OF THE INVENTION

The present invention is generally directed to a new and improved swivel connector and more particularly to a swivel connector assembly for establishing an interconnection between a ball-like member to be pivoted relative to a rod-like member with little effort.

There are many situations where a member must be mounted for pivotal movement. In such situations, connectors are often utilized for enabling pivotal movement of one member relative to another by interconnecting the member to a pivot by a pivot ball.

Connectors for these applications generally include a bearing seat or circular recess which receives and confines the pivot ball while allowing relative pivotal movement therebetween, and means for capturing and supporting an end of the other member. As a result, the one member is rendered free to pivot about the pivot ball.

Because connectors of this variety find considerable use in manufacturing applications, it is necessary for the connectors to allow the required pivot connection to be established in a close and cramped environment with little effort by an operator to minimize assembly time and manufacturing costs. However, the connector must also provide a joint connection of extreme integrity to assure that the joint will be reliable and not fail during operation.

From the foregoing it can be appreciated that a swivel connector must be adapted for assembly to the ball-like pivot member and to a rod-like member with little force. However, the connector must require a high force to cause the connection to come apart.

Lastly, a swivel connector must be adapted for ready and relatively effortless disassembly. This of course is required should the swivel connection be associated with or involved in maintenance service.

It is therefore an object of the present invention to provide a new and improved swivel connector.

It is a more specific object of the present invention to provide a swivel connector which may be easily assembled to a ball-like pivot member and to a rod-like member to permit relative pivoting while thereafter maintaining a reliable joint connection.

It is a still further object of the present invention to provide such a swivel connector which may be readily disassembled for service or the like.

The invention therefore provides a swivel connector assembly for connecting a rod-like member to be pivoted relative to a member having a ball pivot. The swivel connector assembly has a coupler which includes a first socket means having a bearing seat for pivotally confining a ball pivot therein and a second socket means for receiving and capturing a grooved end of a rod-like member. The coupler includes slot means permitting enlargement of the sockets including the bearing seat to enable insertion of the ball-like pivot member into the bearing seat of the first socket means and insertion of the end of the rod-like member into the second socket means. Sleeve means are arranged to be received over the coupler means for clamping the coupler in a position confining the ball-like member and the rod-like member within their respecting sockets.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, and the several figures of which like reference numerals identify identical elements, and wherein:

DESCRIPTION OF THE PREFERRED EMBODIMENT

Figure 1:
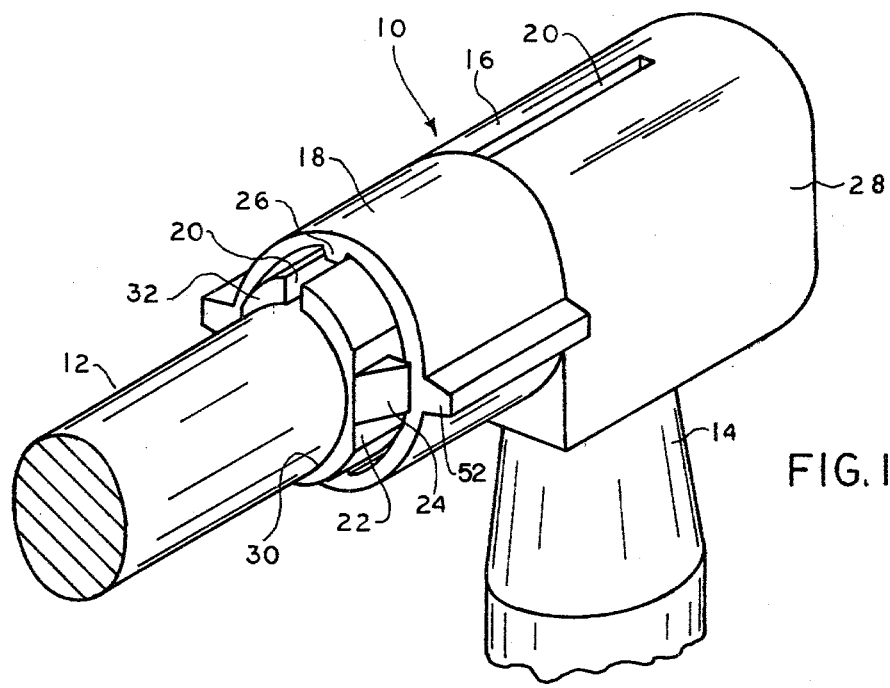
FIG. 1 is a perspective view of a fully assembled swivel connector embodying the present invention pivotally interconnecting a ball-like member and a rod-like member.

Referring now to FIG. 1, a swivel connector 10 is there illustrated in a fully assembled condition for interconnecting and establishing a reliable swivel joint connection between a rod-like member 12 to be pivoted relative to another rod-like member 14 having a pivot ball at one end. (The pivot ball is not shown.) The connector 10 generally includes a coupler or body 16 and a sleeve 18 adapted to be received over a portion of the coupler 16.

The coupler includes a pair of diametrically opposed axially extending slots 20 and is preferably formed from a plastic material to thereby render the coupler 16 deformable. The coupler also includes a pair of diametrically opposed flat surface portions 22 intermediate the slots 20 and latch means comprising a pair of lugs 24 projecting radially outwardly from the socket flat surface portions 22.

The sleeve 18 is initially generally cylindrical in configuration. It includes a pair of ribs 26 on its inner surface, which ribs 26 are axially extending thereon. The ribs 26 preferably include a flat exposed surface 27, having a predetermined width 27b slightly less than the width of slots 20 at one end and tapering outwardly to a widened portion 27a at the opposite end. The rib 26 at the end of the widened portion 27a has a diminished height relative to the inner diameter of sleeve 18. The side walls of the rib 26 taper outwardly from flat 27 to the juncture with the inner surface of sleeve 18, for purposes best set forth hereinafter.

The rod-like member 14 is preferably of the type including a pivot ball (not shown) at the free end which is adapted to be received by a bearing seat 34 within the forward portion 28 of the coupler 16. The member 12, as will be more fully described hereinafter, has an end portion which is adapted to be received, and captured by socket means 30 within the slightly elliptical end portion 32 of the coupler 16.

Figure 2:
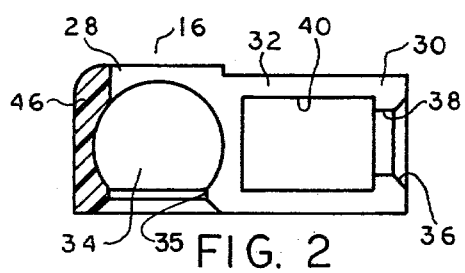
FIG. 2 is a cross-sectional side view of the sockets in the coupler, the coupler forming a part of the swivel connector illustrated in FIG. 1.
Figure 5:
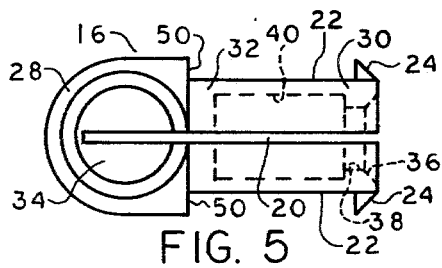
FIG. 5 is a bottom plan view of the connector coupler.

Referring now more specifically to FIGS. 2 and 5, the coupler 16 may be seen to include the forward portion 28 and the slightly elliptical rear portion 32. The forward portion includes a socket having a bearing seat 34 which is defined by a generally spherical recess, of known construction for pivotally receiving a pivot ball or the like and a reduced neck portion 35 communicating with the exterior.

The rear portion 32 includes a socket means 30 which has a tapered opening 36 to assist in the insertion of the member to be received and captured in the socket means. The socket means 30 also includes an annular flange 38 and an enlarged cavity portion 40.

Figure 3:
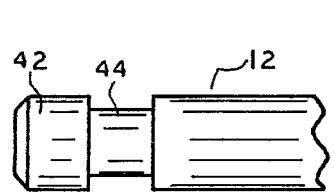
FIG. 3 is a partial side plan view of the grooved end of a rod member adapted to be captured by a socket in the coupler.

As may be seen in FIG. 3, the rod-like member 12 to be captured by the socket includes an end head portion 42 defined by a reduced diameter grooved neck portion 44. As may be appreciated from comparing FIGS. 2 and 3, it will be noted that the head portion 42 of member 12 upon enlargement of the socket means 30 may be received by the enlarged cavity portion 40. The reduced diameter neck portion 44 will be adjacent to the annular flange 38 so that the member 12 will be captured by the socket means 30.

As may be best noted in FIG. 5, the slots 20 extend from the end of the coupler 16 having the socket means 30 and terminate well beyond the center of the bearing seat 34 within the forward portion 28 of the coupler 16. A joining portion 46 results as may be best noted in the cross-sectional view of FIG. 2 because of the slot terminating short of the other end of the coupler 16. By virtue of the slots 20, the coupler is deformable to enable enlargement of the socket means 30 and the necked down opening 35 of bearing seat 34, as previously referred to, for receiving the end head portion 42 of member 12 and the pivot ball, respectively.

Lastly, as may be noted in FIG. 5, the portion 32 of the coupler 16 includes the pair of lugs 24 which project from the flat surface portions 22. The lugs are spaced from a rear wall 50 of the coupler forward of portion 28 to axially fix the sleeve upon the portion 32 but allow rotation of the sleeve relative thereto.

Figure 4:
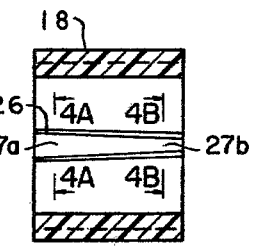
FIG. 4 is a cross-sectional side view of a sleeve adapted to be received over the coupler and rotated relative thereto in accordance with the present invention.
Figure 6:
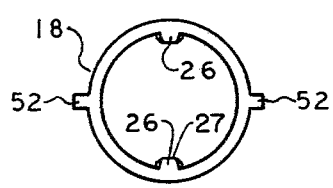
FIG. 6 is an end view of the connector sleeve.
Figures 4A, 4B:
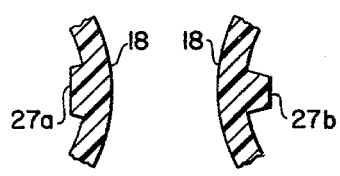
FIG. 4A is a fragmentary section taken along line 4A—4A of FIG. 4.
FIG. 4B is a fragmentary section taken along line 4B—4B.

Referring now to FIGS. 4 and 6, the sleeve 18 is generally cylindrical in configuration and includes the aforementioned axially extending and diametrically opposed tapered ribs 26 on the inner surface thereof. The ribs 26 establish the minimum inner diameter dimension of the sleeve 18, as measured between the tapered flat surfaces 27. The sleeve also includes a pair of diametrically opposed outer gripping means or ribs 52 which are provided to assist an operator in rotating the sleeve relative to the socket.

As thus far described, the connector 10 is assembled as follows. The sleeve 18 is first positioned upon the rod member 12 and the socket means 30 is then enlarged to accept head portion 42 of rod member 12 into enlarged cavity 40. The sleeve 18 is then shifted axially along rod member 12 and over portion 32 of the coupler 16 with the sleeve 18 positioned so that the ribs 26 are adjacent the flat surface portions 22. The flat surface portions 22 are separated by a distance which is less than the distance between the opposed ribs 26. A space therefore exists between the respective pairs of flat surfaces 22 and ribs 26 to allow the coupler 16 to be deformed for enlarging the socket having the bearing seat 34. As a result, insertion of the pivot ball into the bearing seat 34 is afforded.

Once the pivot ball is received within the socket having a bearing seat 34 and with head portion 42 of rod 12 positioned within the cavity 40 of the socket means 30, the sleeve 18 may be rotated relative to the coupler 16 by 90° so that the narrow flat end 27b of ribs 26 lockingly engage the slots 20. It may be noted from the FIG. 1 that the lugs 24 axially fix the sleeve 18 on the socket 16 but allow rotation of the sleeve relative to the socket.

Figure 7:
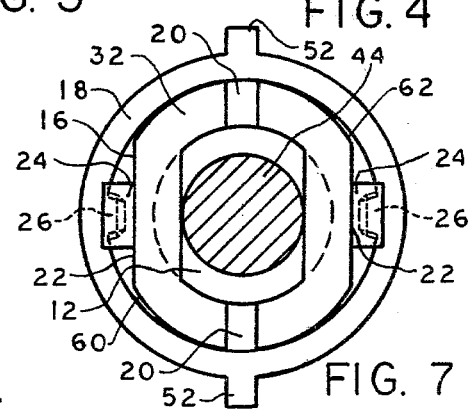
FIG. 7 is an end view of the connector illustrating the sleeve in place on the coupler and in an initially unlocked position with the rod member inserted and permitting assembly of the swivel connection.

Referring now to FIG. 7 the sleeve 18 is positioned upon the portion 32 of the coupler in its initial position with the inner ribs 26 being spaced from and in substantial alignment with the flat surface portions 22 of the socket. The sleeve 18 is axially fixed thereupon by the lugs 24 which project beyond the inner periphery of the sleeve 18.

The maximum diameter of the slightly elliptical portion 32 of the coupler is substantially equal to the maximum inner diameter of the sleeve 18. However, since the ribs 26 are spaced from the flat surface portion 22, the slots 20 permit the coupler 16 to be deformed between joining portion 46 and sleeve 18, permitting enlargement of the socket having the bearing seat 34 for receiving the pivot ball as previously described.

Figure 8:
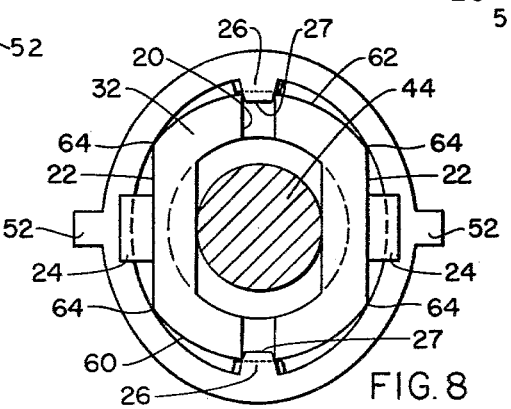
FIG. 8 is an end view similar to FIG. 7 but illustrating the sleeve in a final locked position relative to the coupler to securely lock the sockets relative to the ball pivot and the rod member to establish a reliable swivel joint connection.

Referring now to FIG. 8, as the sleeve 18 is rotated relative to the coupler 16, the ribs 26 will engage the curved outer surfaces 60 and 62 of the cylindrical portion 32 to cause the sleeve 18 to deform to a substantially elliptical shape with the inner surface of sleeve 18 contacting the corners 64 at the intersection of curved surfaces 60–62 and the flat surface portions 22 and thereby clamp the coupler 16 to the pivot ball and the end of member 12. When the sleeve 18 reaches its final locked position as shown in FIG. 8, the wide portion 27a of ribs 26 spans the slot to insure that the elliptical deformation of the sleeve is maintained while the narrow portion 27b of ribs 26 lockingly engages the slots 20 to thereby detent-lock or fix the deformed sleeve 18 in its final position. All the while, the lugs 24 axially fix the sleeve 18 relative to the portion 32 of the coupler.

As a result of the foregoing, a reliable swivel joint is established between the member 12 and the member 14 as shown in FIG. 1. Because the coupler 16 of the connector is deformable permitting enlargement of the socket means 30 and the socket having the bearing seat 34, the connector 10 may be assembled with respect to the member 12 and the member 14 with considerably less force than is required to separate the respective pieces after the sleeve has been applied and rotated to its final position and ready for use. Rotation of the sleeve back to its initial position facilitates the disassembly of the swivel joint connection should such be necessary for service or the like.

While a particular embodiment of the present invention has been shown and described, modifications may be made, and it is applicant's intent to cover in the appended claims all such changes and modifications which fall within the true spirit and scope of the invention.

The invention is claimed as follows:

1. A swivel connector assembly adapted to connect a ball-like member to a rod-like member, the ball-like member having a pivot ball associated therewith, the rod-like member having a head portion defined by a neck portion of reduced diameter, the assembly comprising: an integrally formed coupler, said coupler having a first socket means adapted to confine the pivot ball therein and a second socket means adapted to receive and capture said head portion of the rod-like member, said coupler having a slot means therein passing completely through one of said sockets and partially through the other of said sockets, said slot means permitting enlargement of the said sockets to enable insertion of the head portion and pivot ball into their respective sockets, said coupler having relieved areas on opposite sides thereof proximate the socket which the slot means passes completely through; and a sleeve means, said sleeve means being of a generally cylindrical configuration and dimensioned to be received over and fit closely about the coupler in the area of the completely slotted socket, said sleeve means having at least two inwardly extending tapered projecting means, each projecting means having a portion thereof which is wider than the slot means when said sleeve is received about said coupler, wherein the said sleeve means is adapted to be easily received over the coupler when the projecting means are registered with the relieved areas and rotated to thereby lock the coupler and prevent release of the head portion or the pivot ball.

2. An assembly as defined in claim 1 wherein said projecting means includes rib means along the inner surface of said sleeve means arranged to lockingly engage said slot means for fixing said sleeve means on said coupler against rotation when in said final position.

3. An assembly as defined in claim 2 wherein said coupler includes latch means for fixing said sleeve means on said coupler against axial movement.

4. An assembly as defined in claim 1 wherein said completely slotted means includes a slightly elliptical portion, wherein said second socket means is formed within said elliptical portion and wherein said slot means comprises a pair of diametrically opposed axially extending slots.

5. An assembly as defined in claim 4 wherein said projecting means within said sleeve means is a pair of diametrically opposed axially extending ribs on the inner surface thereof, said ribs being axially tapered in width and height and adapted to engage and move over said slightly elliptical portion and thereby deform said sleeve into an elliptical form and grippingly clamp said coupler against spreading, and wherein said ribs are arranged for lockingly engaging said slots.

6. An assembly as defined in claim 4 wherein said relieved areas are a pair of diametrically opposed outer surface flat portions intermediate said slots, said first portions being spaced apart for permitting said sleeve means to be received by said coupler with said ribs spaced from said flat portions and said sleeve means being rotatable to a final position with said ribs lockingly engaging said slots.

7. An assembly as defined in claim 5 wherein said coupler further includes latch means for axially confining said sleeve means on said coupler.

8. An assembly as defined in claim 7 wherein said latch means includes a pair of lugs projecting radially outwardly from said relieved areas.

9. An assembly as defined in claim 7 wherein said sleeve means further includes a plurality of axially extending outer ribs for assisting in the rotation of said sleeve means from an initial position to the locked position.

10. A swivel connector assembly for connecting a ball-like member to be pivoted to a rod-like member comprising: a coupler, said coupler having a first socket having a bearing seat for confining a ball-like member therein and a generally axially extending slightly elliptical portion including second socket means for receiving and capturing an end of the rod-like member, said coupler including a pair of opposed slots permitting enlargement of said second socket means for insertion of the rod-like member end into said second socket means and enlargement of said bearing seat of said first socket means for insertion of the ball-like member into said bearing seat, a pair of opposed outer surface flat portions intermediate said slots, latch means projecting radially outwardly from said flat surface portions; an initially cylindrical shaped sleeve members having a pair of axially extending tapered inner surface ribs arranged to be received over said axially extending portion in an initial position with said ribs spaced from said flat surface portions to enable said enlargement of said bearing seat, said latch means being arranged to axially fix sleeve upon said coupler when in said initial position, said sleeve being rotatable from said initial position to a rotationally locked position with one end of said ribs engaged with said slots and said sleeve deforming to an elliptical shape for exerting a gradually increasing clamping force on said coupler to cause said sockets to securely confine the ball-like member and the end of the rod-like member.

11. A swivel connector assembly for interconnecting two members to be pivoted relative to one another comprising: a coupler means including means establishing a swivel connection with one of the members and capture means for capturing an end of the other member, said coupler means being deformable to enable said capture means to receive and capture the end of the other member and to enable establishment of said swivel connection, and rotatable clamping sleeve means having opposed ribs on the interior thereof arranged to be received by said coupler means and deforming to a generally elliptical shape to clampingly secure the coupler means upon rotation relative thereto for causing secure capture of the end of the other member and secure establishment of said swivel connection.

* * * * *